United States Patent
Tseng et al.

(10) Patent No.: US 6,882,610 B2
(45) Date of Patent: Apr. 19, 2005

(54) OPTIMAL POWER CALIBRATION METHOD FOR AN OPTICAL DISC

(75) Inventors: Hung-Jen Tseng, Hsin-Chu Hsien (TW); Chi-Mou Chao, Hsin-Chu Hsien (TW); Chih-Yu Fan, Hsin-Chu Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 606 days.

(21) Appl. No.: 09/683,846

(22) Filed: Feb. 21, 2002

(65) Prior Publication Data

US 2003/0156513 A1 Aug. 21, 2003

(51) Int. Cl.[7] .................................................. G11B 7/00
(52) U.S. Cl. .................. 369/47.53; 369/47.5; 369/53.1; 369/59.1; 369/116
(58) Field of Search ............................ 369/47.1, 47.15, 369/47.5, 47.51, 47.52, 47.53, 47.55, 53.1, 53.11, 59.1, 59.11, 116

(56) References Cited

U.S. PATENT DOCUMENTS 5,559,785 A * 9/1996 Honda et al. ............ 369/59.12
5,790,491 A * 8/1998 Jaquette et al. .......... 369/47.53
6,556,524 B1 * 4/2003 Takeshita ................. 369/47.43

* cited by examiner

Primary Examiner—Muhammad Edun
(74) Attorney, Agent, or Firm—Winston Hsu

(57) ABSTRACT

An optimal power calibration (OPC) method calibrates writing power for an optical disc. The optical disc includes a power calibration area, with a plurality of counting units and test blocks. The OPC method includes generating a plurality of first power levels by using an indicated power, selecting a plurality of second power levels from the first power levels, recording test data onto test blocks with the second power levels, reading the test blocks, and generating data signals and first beta values. The method further includes generating estimated optimal power by a calculating algorithm, generating a plurality of third power levels by using the estimated optimal power, recording test data onto test blocks with the third power levels, reading the test blocks, and generating data signals and second beta values. Optimal power is calculated by using the estimated optimal power, the first beta values, and the second beta values.

17 Claims, 6 Drawing Sheets

_US 6,882,610 B2_

OPTIMAL POWER CALIBRATION METHOD FOR AN OPTICAL DISC

BACKGROUND OF INVENTION

1. Field of the Invention

The present invention relates to a calibration method for an optical disc, and more particularly, to an optimal power calibration method for an optical disc of an optical system.

2. Description of the Prior Art

Along with the growing use of computers comes an increasing amount of digital data. One convenient way of storing this data is through the use of optical recorders, which include such devices as CD-RW drives. Optical recorders make use of a laser to write data onto an optical disc such as a CD-R disc. Writing data onto an optical disc is a very delicate process, and great care must be taken to prevent the disc from being ruined during the writing process. To help ensure the quality of the data stored on the optical disc, power calibration methods are used to calibrate the power of the laser that writes information onto the optical discs.

Please refer to FIG. 1. FIG. 1 is a schematic diagram of a CD-R 10 that is used during a write process. Only a ninety-degree sector of the CD-R 10 is shown for clarity. The CD-R 10 contains a center hole 12, a Power Calibration Area (PCA) 14, a Program Memory Area (PMA) 16, a lead-in area 18, a program area 20, and a lead-out area 22. In addition, the PCA 14 includes a count area and a test area. The count area has a plurality of counting units, and the test area has a plurality of test blocks that correspond to each of the counting units. The optical recorder uses these test blocks for writing test data onto the test blocks during the calibration process.

Please refer to FIG. 2 and FIG. 3. FIG. 2 is a flowchart of a method of optical power calibration according to the prior art. FIG. 3 is a chart illustrating the prior art method shown in FIG. 2. In the prior art method, the optical recorder reads an indicated power 40 from either the lead-in area 18 of the CD-R 10 or from a firmware database of the optical recorder, and then uses the indicated power 40 to calculate an optimal power 46. The laser is then supplied with the optimal power 46 when writing to the CD-R 10. The steps in the prior art calibration method are shown below.

step 30: read the indicated power 40 from the lead-in area 18; step 32: calculate 15 power levels (index values 0–14) that evenly cover a range 0.7*(indicated power) 44 to 1.3*(indicated power) 42, and use the 15 power levels to perform a test write; and step 34: calculate write performance of each of the 15 power levels, and use the write performance results to calculate the optimal power 46 through calculations involving interpolation or extrapolation.

As shown in FIG. 3, the 15 power levels have index values 0 to 14. The 15 power levels are evenly distributed, with index 0 laser power equal to 0.7*(indicated power) 44, index 14 laser power equal to 1.3*(indicated power) 42, and index 7 laser power equal to the indicated power 40. The optical recorder will perform test writes using each of these 15 power levels to help approximate exactly where the optimal power 46 lies. When the optimal power 46 is used to write to the CD-R 10, High Frequency (HF) signals are produced that have perfectly symmetric amplitudes. Each HF signal has an upper amplitude A1 and a lower amplitude A2. An amplitude measurement β is used to compare the relative sizes of A1 and A2, and is defined by the relationship β=(A1 A2)/(A1+A2). The optimal power 46 produces HF signals where the upper amplitude A1 is exactly equal to the lower amplitude A2, or β=0. By comparing β values of HF signals produced by test writes using each of the 15 power levels, an estimate of the optimal power 46 can be calculated.

Using FIG. 3 as an example, suppose that the optimal power 46 lies between index 8 laser power and index 9 laser power. The optical recorder then writes test data using each of the 15 power levels. When writing test data with the index 8 laser power, the lower amplitude A2 of the HF signal is greater than the corresponding upper amplitude A1, and β<0. On the other hand, when test writing with the index 9 laser power, the upper amplitude A1 of the HF signal is greater than the corresponding lower amplitude A2, and β>0. Thus, by analyzing the results of these two test writes, the optical recorder can calculate that the optimal power 46 lies between index 8 and index 9 laser powers. Interpolation can be used to accurately calculate the optimal power 46 by finding the laser power in which β=0.

However, problems can arise in the prior art method of calibrating optimal laser power. Every time the prior art calibration method is executed, each of the 15 power levels is used to perform a test write. Unfortunately, the CD-R 10 can be damaged by high power lasers during the test write process. For example, if the optimal power 46 is a lot lower than the indicated power 40, writing with index 15 laser power could destroy a surface of the CD-R 10 because the index 15 laser power is higher than the specification of the CD-R 10 allows. In this case, the CD-R 10 is ruined in the power calibration process, which is before the optical recorder even has a chance to write data to the program area 20 of the CD-R 10.

SUMMARY OF INVENTION

It is therefore a primary objective of the claimed invention to provide an optimal power calibration (OPC) method for an optical disc of an optical recorder system for solving the above-mentioned problems.

According to the claimed invention, the optical disc includes a power calibration area, which has a count area and a test area. The count area has a plurality of counting units, and the test area has a plurality of test blocks corresponding to each of the counting units for printing test data. The OPC method includes generating a plurality of first power levels by using an indicated power, selecting a plurality of second power levels from the first power levels, recording test data onto test blocks with the second power levels, reading the test blocks, and generating data signals and first beta values. The method further includes generating an estimated optimal power by a calculating algorithm, generating a plurality of third power levels by using the estimated optimal power, recording test data onto test blocks with the third power levels, reading the test blocks, and generating data signals and second beta values. An optimal power is calculated by using the estimated optimal power, the first beta values, and the second beta values.

It is an advantage of the claimed invention that the OPC method initially uses the second power levels to record test data onto the test blocks since the second power levels are lower than the indicated power. This prevents overly powerful test lasers from damaging the optical disc.

These and other objectives of the claimed invention will no doubt become obvious to those of ordinary skill in the art after reading the following detailed description of the preferred embodiment, which is illustrated in the various figures and drawings.

DETAILED DESCRIPTION

The present invention optimal power calibration (OPC) method provides an improvement over the prior art method of power calibration for an optical disc recorder. Since the prior art CD-R 10 used in the description of the prior art is also used in the present invention, a description of the CD-R 10 will not be repeated.

In the present invention, an optical recorder first needs to read an indicated power from the lead-in area 18 of the CD-R 10. Alternately, the indicated power can be read from a firmware database stored in the optical recorder. Once this indicated power is read, the optical recorder can then determine appropriate test power levels. To prevent the CD-R 10 from being damaged by high power lasers, the present invention uses an improved OPC method that limits the possibility of damage to the CD-R 10.

Figure 1:
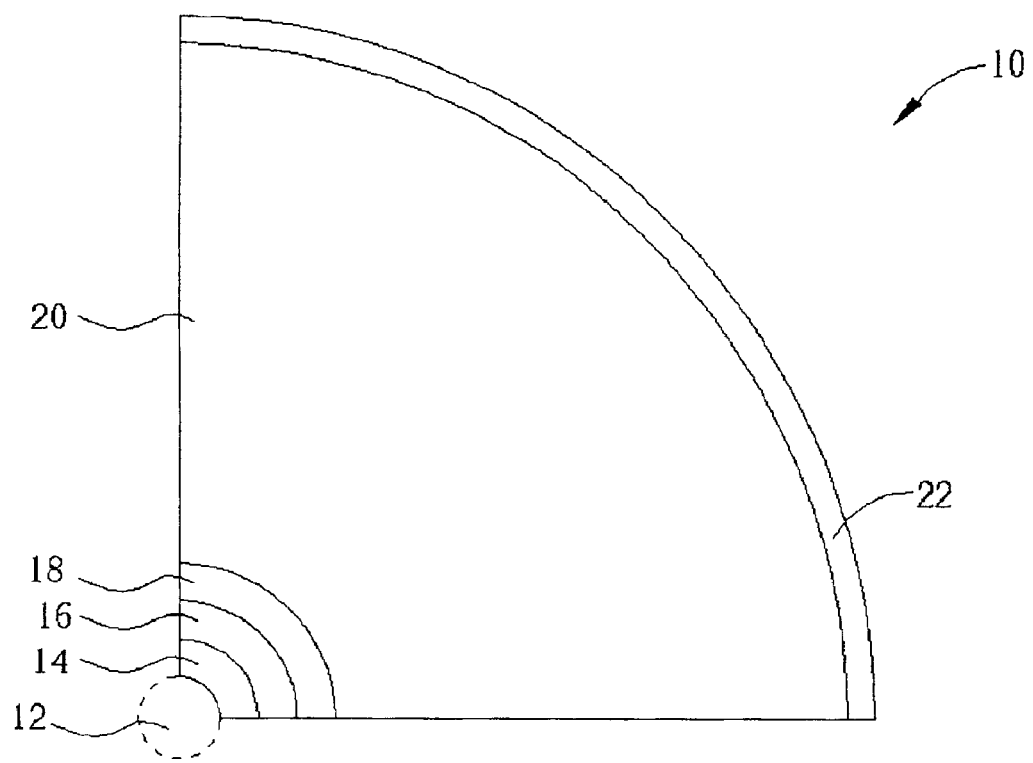
FIG. 1 is a schematic diagram of a CD-R 10 that is used during a write process.
Figure 2:
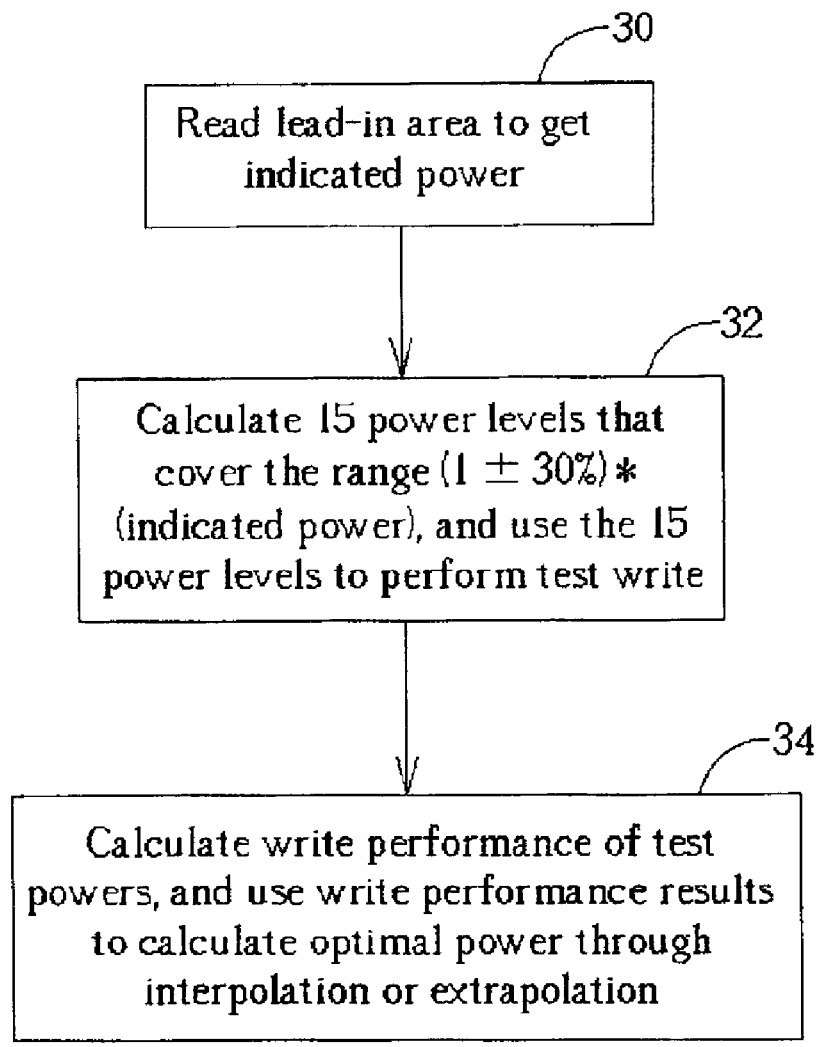
FIG. 2 is a flowchart of a method of optical power calibration according to the prior art.
Figure 3:
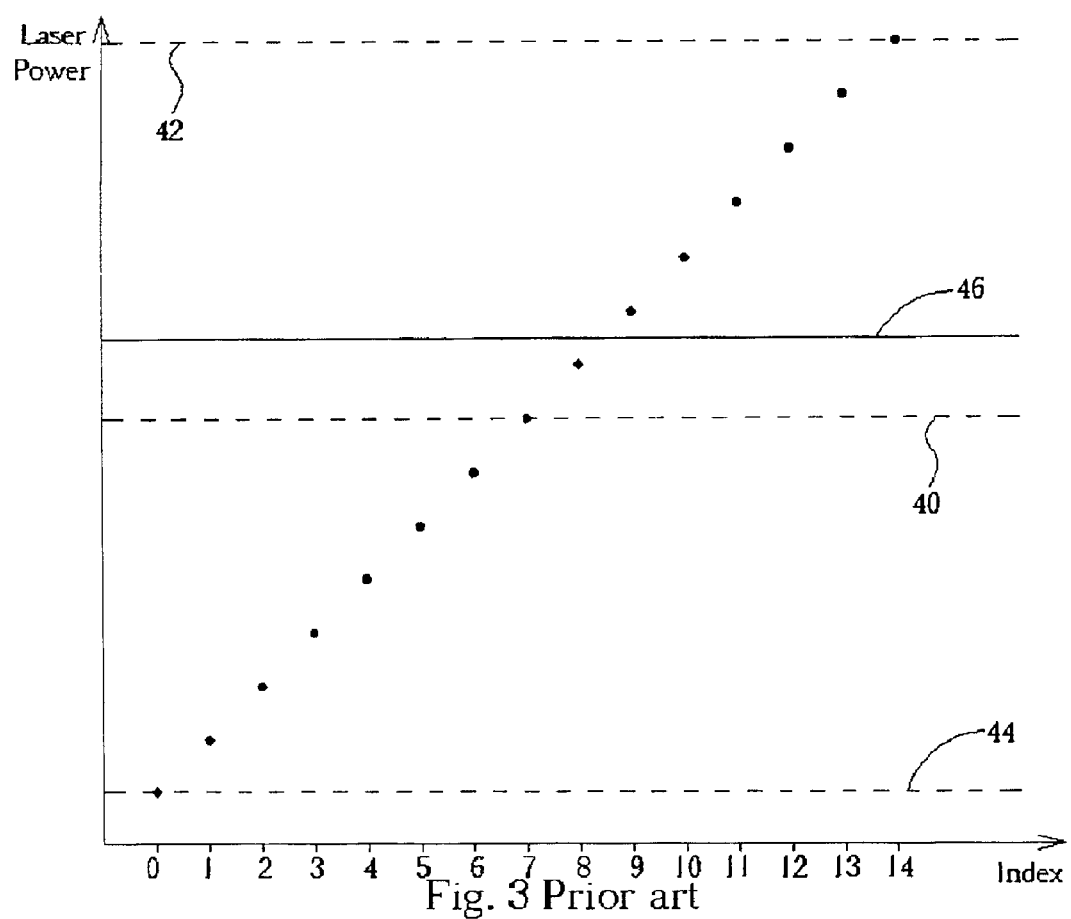
FIG. 3 is a chart illustrating the prior art method shown in FIG. 2.
Figure 4:
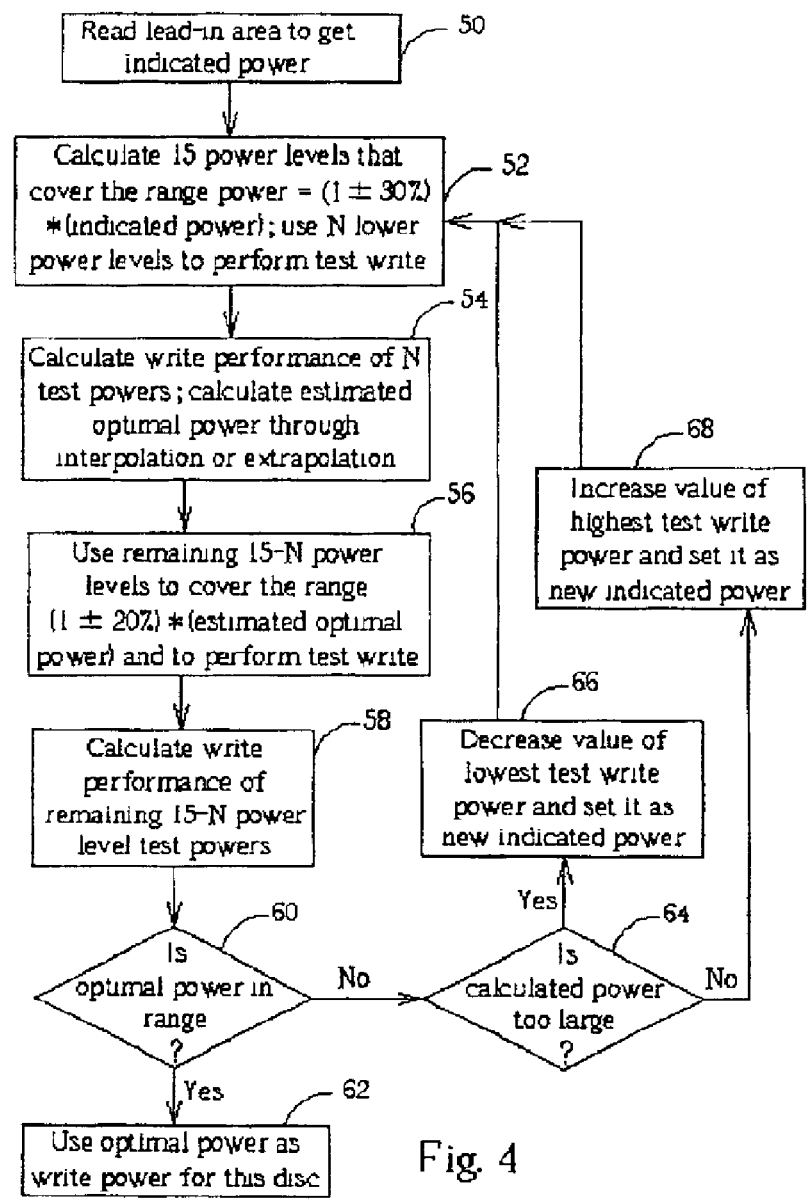
FIG. 4 is a flowchart of an optimal power calibration (OPC) method according to the prior art.
Figure 5:
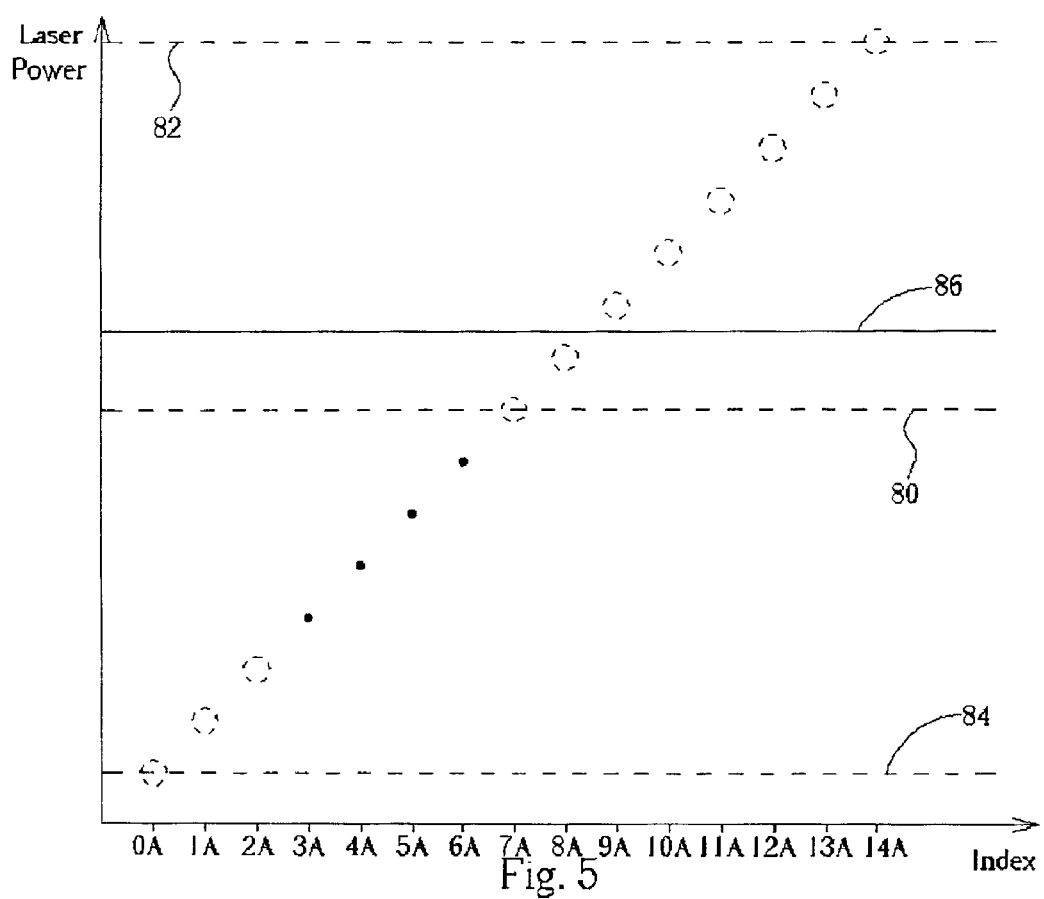
FIG. 5 and FIG. 6 are charts illustrating the OPC method shown in FIG. 4.
Figure 6:
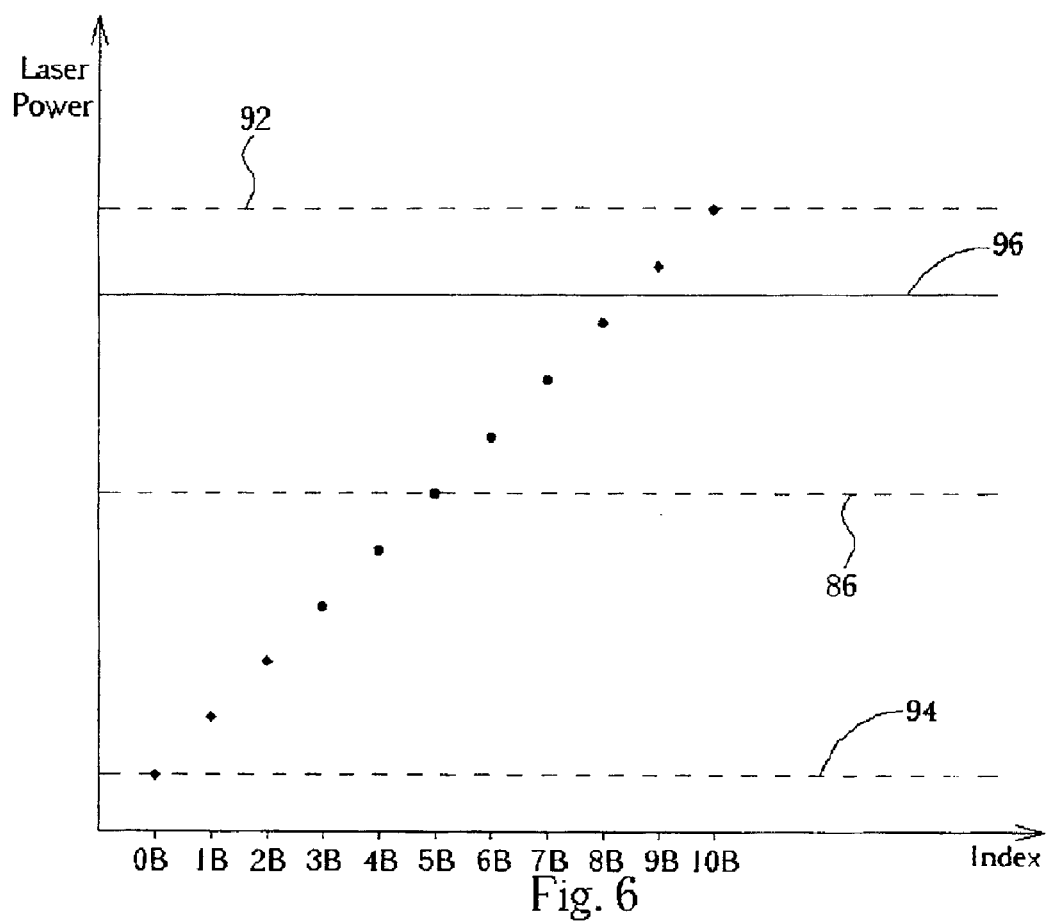

Please refer to FIG. 4 to FIG. 6. FIG. 4 is a flowchart of the OPC method according to the prior art. FIG. 5 and FIG. 6 are charts illustrating the OPC method shown in FIG. 4. Like the prior art method, the present invention OPC method writes test data using 15 power levels in order to find optimal power 96. However, the present invention OPC method does not execute each of the 15 test writes all at the same time. Instead, N number of lower power levels are first used to give the optical recorder a narrower range in which the optimal power 96 might reside. The steps in the present invention OPC method are shown below.

step 50: read indicated power 80 from lead-in area 18; step 52: calculate 15 power levels (index values 0A–14A) that evenly cover a range 0.7*(indicated power) 84 to 1.3*(indicated power) 82; use N lower power levels to perform a test write; step 54: calculate write performance of each of the N lower power levels; use the write performance results to calculate an estimated optimal power (EOP) 86 through calculations involving interpolation or extrapolation; step 56: use remaining 15-N power levels (index values 0B–10B) to cover a range 0.8*EOP 94 to 1.2*EOP 92; use these remaining 15-N power levels to perform a test write; step 58: calculate write performance of each of the remaining 15-N power levels; step 60: determine if the optimal power 96 in the range 0.8*EOP 94 to 1.2*EOP 92; if so, go to step 62; if not, go to step 64; step 62: use the optimal power 96 as the write power to record data onto the program area 20 of the CD-R 10; step 64: determine if the calculated optimal power higher than the range 0.8*EOP 94 to 1.3*EOP 92; if so, go to step 66; if not, then the calculated optimal power is lower than the range, go to step 68; step 66: decrease the value of a lowest test write power, which is 0.7*(indicated power) 84, and set the decreased value as a new indicated power; go to step 52; and step 68: increase the value of a highest test write power, which is 1.3*(indicated power) 82, and set the increased value as a new indicated power; go to step 52.

To help clarify the above flowchart, FIG. 5 and FIG. 6 will be used as an example to illustrate the present invention OPC method. Once an indicated power 80 is read from the lead-in area 18 of the CD-R 10 or from the firmware database of the optical recorder, 15 power levels are generated, as shown in FIG. 5. These 15 power levels range from 0.7*(indicated power) 84 to 1.3*(indicated power) 82. Out of these initial 15 power levels, N lower levels are chosen for performing test writes on the CD-R 10. For example, in FIG. 5, N=4, and the 4 power levels are index values 3A–6A. For extra safety, each of the N lower levels should be below the indicated power 80. This helps to ensure that no overly powerful lasers are used when testing the CD-R 10.

Next, these N lower power levels are used to write data onto test blocks contained in the PCA 14. Similar to the prior art method, β values are measured for each of the test blocks. Based on these first β values, the estimated optimal power (EOP) 86 is calculated through either interpolation or extrapolation.

As shown in FIG. 6, the EOP 86 is then used to form a remaining set of power levels ranging from 0.8*EOP 94 to 1.2*EOP 92. Since 4 of the 15 power levels were tested previously, the remaining set of power levels only includes 11 power levels, which are index values 0B–10B. Next, these remaining power levels are used to write data onto test blocks contained in the PCA 14, and second β values are calculated. Based on the second β values, the optimal power 96 is calculated through interpolation or extrapolation.

As shown in step 60 of the flowchart in FIG. 4, if the optimal power 96 was not found to be in the range 0.8*EOP 94 to 1.2*EOP 92, then the indicated power 80 is adjusted accordingly. For example, if the optimal power 96 was found to be higher than the range 0.8*EOP 94 to 1.2*EOP 92, the indicated power 80 is reset to a value greater than 1.2*EOP 92. On the other hand, if the optimal power 96 was found to be lower than the range 0.8*EOP 94 to 1.2*EOP 92, the indicated power 80 is reset to a value less than 0.8*EOP 94. After the new indicated power has been determined, the OPC process is started again from step 52 using the new indicated power.

As shown in step 62 of the flowchart in FIG. 4, if the optimal power 96 was found to be in the range 0.8*EOP 94 to 1.2*EOP 92, the OPC process is finished, and the optimal power 96 is then used to record data onto the program area 20 of the CD-R 10.

The OPC method of the present invention is not limited to power calibration of CD-R discs. The present invention OPC method can also be used to calibrate laser power for any optical disc such as CD-RW, DVD-R, DVD-RW, DVD+RW, etc.

Compared to the prior art, the present invention OPC method uses a two-step testing process to determine the optimal power with which to write to an optical disc. The first testing process uses N lower power levels that are all below the indicated power. By using only lower power levels, the likelihood of damaging the optical disc with powerful lasers is highly diminished. Moreover, results of the first testing process are used to conduct a more accurate second testing process in which the optimal power can be precisely determined. Therefore, the present invention provides a safe and accurate method for performing optical power calibration.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optimal power calibration (OPC) method for an optical disc of an optical system, the optical disc including a power calibration area which has a count area and a test area, the count area having a plurality of counting units, the test area having a plurality of test blocks corresponding to each of the counting units for printing test data, the method comprising:

generating a plurality of first power levels by using an indicated power;

selecting a plurality of second power levels from the first power levels;

recording test data onto test blocks with the second power levels;

reading the test blocks and generating data signals and first beta values;

generating an estimated optimal power by a calculating algorithm;

generating a plurality of third power levels by using the estimated optimal power;

recording test data onto test blocks with the third power levels;

reading the test blocks and generating data signals and second beta values;

generating an optimal power from the estimated optimal power, the first beta values and the second beta values.

2. The OPC method of claim 1 wherein the second power levels are lower than the indicated power.

3. The OPC method of claim 1 wherein the indicated power is stored in a lead-in area of the optical disc, the OPC method further comprising reading the indicated power from the lead-in area.

4. The OPC method of claim 1 wherein the indicated power is stored in a firmware database of an optical recorder, the OPC method further comprising reading the indicated power from the firmware database of the optical recorder.

5. The OPC method of claim 1 wherein the calculating algorithm is used for interpolating the second power levels.

6. The OPC method of claim 1 wherein the calculating algorithm is used for extrapolating the second power levels.

7. The OPC method of claim 6 wherein the beta values are calculated by using amplitude information of data signals.

8. The OPC method of claim 1 further comprising adjusting the optimal power level and setting the adjusted power level as a new indicated power if the optimal power level is not preferred optimal power level.

9. The OPC method of claim 8 wherein the optimal power level is adjusted by decreasing the lowest power of the third power levels.

10. The OPC method of claim 8 wherein the optimal power level is adjusted by increasing the highest power of the third power levels.

11. The OPC method of claim 1 wherein the optimal power level is a power level for recording data onto a program area of the optical disc.

12. The OPC method of claim 1 wherein the optical disc is a CD-R disc.

13. The OPC method of claim 1 wherein the optical disc is a DVD-R disc.

14. The OPC method of claim 1 wherein the optical disc is erasable.

15. The OPC method of claim 1 wherein the optical disc is a CD-RW disc.

16. The OPC method of claim 1 wherein the optical disc is a DVD–RW disc.

17. The OPC method of claim 1 wherein the optical disc is a DVD+RW disc.

* * * * *